United States Patent [19]
Taniguchi et al.

[11] Patent Number: 5,991,109
[45] Date of Patent: *Nov. 23, 1999

[54] MAGNETIC RECORDING AND REPRODUCING APPARATUS WITH SIGNAL DELAY AND SELECTION

[75] Inventors: Masatoshi Taniguchi; Toshiyuki Kohri, both of Osaka-fu; Keiichi Ishida, Hyogo-ken, all of Japan

[73] Assignee: Matsushita Electric Industrial Co., Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/751,328

[22] Filed: Nov. 18, 1996

[30] Foreign Application Priority Data

Nov. 21, 1995 [JP] Japan .................................. 7-302597

[51] Int. Cl.⁶ .................................................. G11B 15/14
[52] U.S. Cl. .......................... 360/64; 360/77.14; 360/51
[58] Field of Search ........................... 360/45, 65, 77.14, 360/64, 77.12, 68, 60, 24, 13, 31; 455/422; 382/320; 371/56, 32; 375/229, 334; 386/91; 702/124

[56] References Cited

U.S. PATENT DOCUMENTS 4,797,947  1/1989  Labedz ................................... 455/422
5,321,557  6/1994  Shimotashiro et al. .
5,440,434  8/1995  Kanegae .
5,655,050  8/1997  Yamamoto et al. .

FOREIGN PATENT DOCUMENTS 62-8991    2/1987  Japan .
2202186    8/1990  Japan .
5210802    8/1993  Japan .

OTHER PUBLICATIONS

An English Language Abstract o JP 2–202186.
An English Language Abstract of JP 62–8991.
An English Language Abstract of JP 5–210802.

Primary Examiner—Muhammad Edun
Attorney, Agent, or Firm—Greenblum & Bernstein, P.L.C.

[57] ABSTRACT

A magnetic recording and reproducing apparatus includes a reading and writing head for writing data on data tracks formed on a recording tape and reading the data therefrom to produce a first reproduction data. A simultaneous reproducing head is provided for reading a second production data from the data track just being written or read by the reading and writing head. A delay unit delays the first signal by a predetermined phase difference factor to arrange the first and second reproduction data on the same time base. A determiner is also provided for selecting either of said first and second reproduction signals whose signal quality is better than the other.

7 Claims, 9 Drawing Sheets

MAGNETIC RECORDING AND REPRODUCING APPARATUS WITH SIGNAL DELAY AND SELECTION

BACKGROUND OF THE INVENTION

1. Field of the Invention

The present invention relates to a magnetic recording and reproducing apparatus which magnetically records a digital data on a recording medium and reproduces the recorded digital data therefrom utilizing a helical scanning method, and particularly, to a magnetic recording and reproducing apparatus which can widen a playback speed range of special reproduction modes such as slow-forward and reverse play without a degradation of the reproduced data quality.

2. Description of the Prior Art

In a conventional magnetic recording apparatus such as a digital video tape recorder (DVTR) or a digital video cassette tape recorder (DVCR), wherein a head cylinder includes writing magnetic heads and reading magnetic heads, a recording tape is wrapped around the rotating head cylinder in a helical-shaped tape path for the recording and reproducing operations. The data is magnetically recorded on the recording tape by rotating the cylinder to scan recorded tracks with the writing head having a predetermined azimuth angle. The reading head with the same azimuth angle as that of the writing head scans the recording tracks that were scanned and recorded by the writing head just before to reproduce the recorded data therefrom. By arranging a pair of writing and reading heads having the same azimuth angle at a predetermined relational positions, the data recorded on the recording media can be reproduced from the recorded media at substantially the same time as the recording operation However, the reading (reproducing) head scans across the tracks under the reverse-playback mode, because the data track extending direction is different from the reading (reproducing) head scanning direction. Therefore, the data obtained through every scanning are collectively stored in a memory, and are outputted as a video signal when the data in the memory becomes enough for one frame.

With reference to FIGS. 10, 11, 12, 13, and 14, an example of the conventional magnetic apparatus will be described in detail herebelow. As schematically shown in FIG. 10, a conventional magnetic apparatus CMA has mainly three functional system, a recording system, a head system Huc, and a reproducing system RSc that are constructed as shown therein.

In the recording system WS, a source analog signal Sv inputted through an input terminal 101 is digitized by a digital encoder 102 into an encoded source data Svd, and is further added with the error correction code by an ECC adder 103. Thus, a recording encoder 104 is constructed by the digital encoder 102 and the ECC adder 103 produces a recording data Sve in a digital format suitable for data exchange. This digitized recording data Sve is, then, modulated (Svm) and amplified (Sva) for the convenience of the recording process by the head unit HUc.

In the head unit Huc, a pair of reading/writing heads Rpa and Rpb and a pair of simultaneous reproduction (reading) heads Pa and Pb are provided in a circumferential side surface thereof such that each head pairs opposes each other, as best shown in FIG. 10. The writing (recording) heads Rpa and Rpb are used for writing the data Sva from the recording system WS to a recording tape TA wrapped therearound in a helical tape path and also for reading the data from the tape TA. The simultaneous reproduction (reading) heads Pa and Pb are used only for reproducing the data from the tape TA.

The reading/writing head Rpa and simultaneous reproducing head Pa are located with a predetermined positional relationship so that the head Pa can simultaneously reproduce the data from the track to which the head Rpa is just writing data, and are called a simultaneous reproduction head pair SHa. Similarly, another simultaneous reproduction head pair SHb is formed by the heads Rpb and Pb. The heads belonging to the same head pairs have the same azimuth angle, but are different form the azimuth angle of the other head pairs. Under the recording mode, the head unit Huc and tape TA are in the fixed directions indicated by arrows Dh and Dt, respectively. However, the tape TA can be fed in bilateral directions, or forwarding and reversing in direction Dt.

In the reproducing system RS, an reproducing amplifier 112c amplifies a data Sv read from the tape TA by either of heads RPa, RPb, Pa, and Pb to produce an amplified reproduction data SvP. A reproducing equalizer 114c equalizes the data SvP to produce an equalized data EvP. A reproducing demodulation 117c demodulates the equalized data Evp to produce a demodulated reproduction data Smc. An ECC corrector 121c performs an error correction of the demodulated reproduction data Smc to produce an error free demodulated reproduction data Svd. A digital decoder 122c decodes the reproduction data Svd to reproduce the original data Sv that will be outputted through an output terminal 124. Thus, the amplifier 112, equalizer 114c, and demodulator 117c construct a reproducing unit Rc which prepares the digital data Smc suitable for digital decoding process by a recording decoder 123c that is constructed by the ECC corrector 121c and the digital decoder 122c.

In FIG. 11, traces of head on the recording tape by the conventional magnetic recording and reproducing apparatus CMA under a slow-reverse playback mode wherein the data is reproduced at a reduced reproduction speed, or a half of the normal playback speed but the feeding direction is reversed, is shown. In this case, the tape TA is fed to the reversed playback direction −Dt, and the head is rotated in the fixed direction Dh. Several tracks formed on the tape TA are shown in rectangular shapes extending perpendicularly to the tape feeding direction Dt, each adjacent to each other. For the sake of brevity, only twelve tracks are discretely described with track numbers Tr1 to Tr-10 arranged in order along with the normal tape feeding direction Dt.

Slant arrows S1 to S10 in solid lines rising up diagonally to the left side inside the tracks TR 0 to TR-7 indicate traces of the head formed during the half-speed slow-reverse playback. Each of trace arrows S1 to S10 corresponds to a scanning by the simultaneous reproducing heads Pa and Pb alternately. FIGS. "1.1, 1.5, 1.9" and "−6.9, −6.5, −6.1" typically shown in the tracks TR1 and TR-7 respectively indicate the position on the corresponding tracks. For example, the integral number "−6" and fractional number "−0.9" of figure "−6.9" in the track TR-7 indicate the track No. and the linear position far from the track starting end. In this sense, these figures can be referred to as "an inter track position index". Specifically, the inter track position index is numbers not less than the track numbers TRn of the corresponding track, but less than TRn+1 of the next track. The simultaneous reproducing heads are constructed to have a track scanning width 1.28 times greater than that of the reading and writing heads such that they can reproduce the data from the target rack on which they scan at least two thirds area in the width of track.

In FIG. 12, a relationship between track scanning periods and the tracks from which the data can be reproduced under the half-speed slow-reverse playback mode of FIG. 11 are shown. Numbers, 0 to 10, shown in the horizontal axis TS each indicates a track scanning period SST required for a single head to scan one track on the tape TA under the normal playback mode at the scanning speed same as the data writing. Numbers, −1 to −5, shown in the vertical axis each indicates track number of corresponding tracks, and is located on a boundary distinguishing the corresponding track from the next track. For example, the track TR1 is described between the horizontal axes with 0 and −1.

As apparent from FIGS. 11 and 12, even in the conventional magnetic recording and reproducing apparatus CMA shown in FIG. 10 can reproduce the data from the tape keeping the continuity of track numbers in the range of slow-reverse playback speed from 0 to −½ of normal playback speed. Even though the head sometimes fails to read the data from the tracks scanned by themselves In other words, the data can be reproduced from every track, enabling a noiseless slow playback mode. Specifically, the data on the track TR-t can be reproduced fully by head tracings S8 and S10, as shown in FIG. 11. Under the noiseless slow playback mode means, full frame images can be reproduced at a reduced speed.

In FIG. 13, traces of head on the recording tape by the conventional magnetic recording and reproducing apparatus CMA under a slow-reverse playback mode, similar to those shown in FIG. 11 but the data reproduction is two thirds of the normal playback speed, is shown. In FIG. 14, a relationship between track scanning periods and the tracks from which the data can be reproduced under the half-speed slow-reverse playback mode of FIG. 13 are shown. As is apparent from FIGS. 13 and 14, the data on the track TR-5 can be intermittently reproduced by head tracings S6 and S8, disabling the noiseless slow playback. Thus, the reproducing speed enabling the noiseless slow playback is limited in the conventional magnetic recording and reproducing apparatus having simultaneous scanning head pairs.

SUMMARY OF THE INVENTION

The present invention has been developed with a view to substantially solving the above described disadvantages and has for its essential object to provide a magnetic recording and reproducing apparatus.

In order to achieve the aforementioned objective, a magnetic recording and reproducing apparatus for recording an information on a recording medium having a plurality data tracks for storing said information, said apparatus comprises a first head means for writing said information to said data track and reading said information therefrom to produce a first reproduction signal, a second head means provided beside said first head means with a predetermined interval for reading said data track that is being read by said first head means to produce a second signal, said second signal being delayed from said first signal by a first delay time corresponding to said interval, a first delay means for delaying said first signal by said predetermined phase to produce a first delayed signal, said first delayed signal being on the same time base of said second signals and on a same time base, and a signal selection means for selecting either of said first and second signals whose signal quality is better than the other.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

Hereinafter, a preferred embodiment of the present invention is described with respect to a magnetic recording and reproducing apparatus of a helical scanning type, for example, wherein a single unit of video signal for several fields (for example, 2 fields=1 frame) is written over several tracks (10 tracks, for example). This recording method is referred to as a segment recording system.

Figure 1:
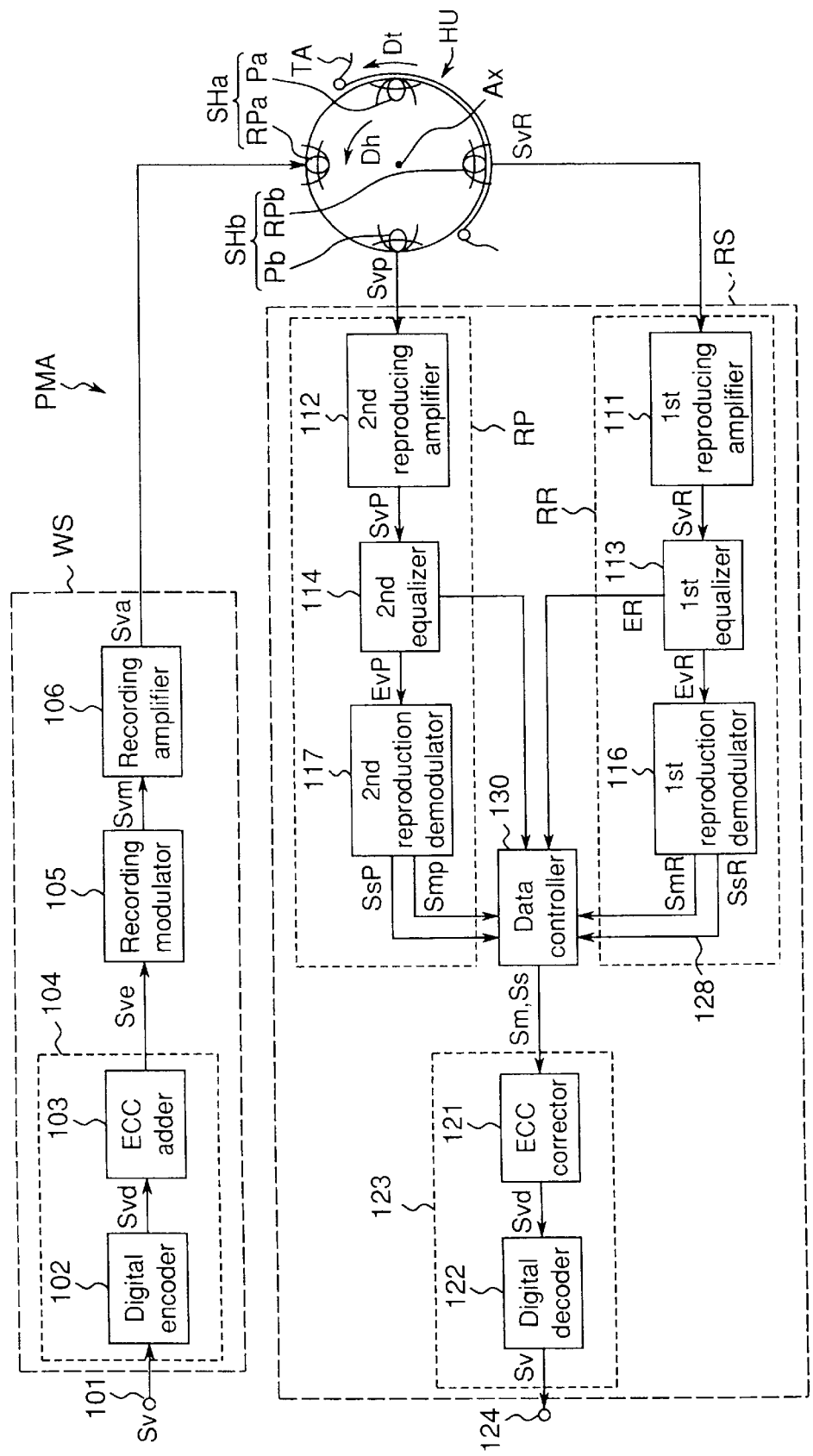
FIG. 1 is a block diagram schematically showing a magnetic recording and reproducing apparatus according to the present invention.

Referring to FIG. 1, a block diagram of a magnetic recording and reproducing apparatus according to a preferred embodiment of the present invention is shown. The magnetic recording and reproducing apparatus PMA is mainly comprised of three functional systems. The first is a recording system Ws for processing an analog source data Sv to produce a digital. The second is a head system HU for writing the digital recording data Svd on a recording tape TA wrapped therearound and reading the recorded data Svd therefrom. The third is a reproducing system RS for processing the data Svd read out from the recording tape TA to reproduce the source data Sv.

The recording system WS includes an input terminal 101 for receiving the source data Sv carrying any kinds of information such as video, audio, computer data, and so on from an external data source (not shown). A digital encoder 102 is connected to the input terminal 101 for receiving the source data Sv therefrom. Then, the digital encoder 102 applies various digital processes such as digital component conversion, compression, and coding to the data Sv, and produces an encoded source data Svd in a digital format. An ECC adder 103 is connected to the encoder 102 for receiving the encoded source data Svd therefrom to generate an error correction code ECC based thereon. The ECC adder 103 further adds the error correction code to the data Svd, and produce an encoded recording data Sve. Thus, the digital encoder 102 and the ECC adder 103 construct a recording encoder 104 for producing the encoded recording data Sve based on the source data Sv.

A modulator 105 is connected to the ECC adder 103 of the recording encoder 104 for receiving the encoded recording data Sve therefrom. The modulator 105 modulates the encoded recording data Sve to produce a modulated recording data Svm with a synchronization pattern incorporated therein, suitable for the recording operation. A recording amplifier 106 is connected to the modulator 105 for receiving the modulated encoded recording data Svm therefrom to produce an amplitude increased modulated data Sva.

The head unit HU whose top view is schematically shown in FIG. 1, is formed in a cylindrical drum configuration. The recording tape TA is wrapped around the head unit HU in a helical-shaped tape path. In operation, the head unit HU rotates in an arrow direction DR and the tape is fed in a counter-direction indicated by an arrow Dt. The head unit HU has first and second reading and writing heads RPa and RPb incorporated in the circumferential surface thereof. These heads RPa and RPb are located preferably on an opposite position for writing or reading the data Sva on the recording tape TA. Hereinafter, the reading and writing head is referred to as a "R/W head" for the sake of brevity. Both the first and second R/W heads RPa and RPb are connected to the recording amplifier 106 of the recording system WS for receiving the amplitude increased modulated data Sva therefrom to record thereof on the recording tape TA. Note that, in FIG. 1, the case that the first R/W head RPa is connected to the amplifier 106 is shown.

The head unit HU further has first and second simultaneous reading heads Pa and Pb also incorporated in the circumferential surface thereof on an opposite position for reading the data Svd from the recording tape TA. Hereafter, the simultaneous reading head are referred to as a "SR head" for the sake of brevity. Note that SR head is provided on a suitable position such that the SR head can simultaneously scan the same track, scanned by the R/W head just before, in order to read the data therefrom. Therefore, the first SR head Pa is located on a down stream position against the first R/W head RPa with respect to the tape scanning order to scan the same track simultaneously, and a predetermined interval Y is kept therebetween.

Similarly, the second SR head Pb is on the upper steam position against the second R/W head RPb to scan the same track simultaneously. Thus, the first R/W head RPa and SR head Pa construct a first simultaneous scanning head pair SHa. The second R/W head RPa and SR head Pb construct a second simultaneous scanning head pair SHb. It is to be noted that the first and second simultaneous scanning head pairs SHa and SHb are substantially identical. The simultaneous scanning head pairs SHa and SHb are collectively referred as to the simultaneous scanning head pair SH.

In this sense, it is apparent that each of heads should not be located on the circumferential position with the same interval, though four heads RPa, RPb, Pa, and Pb seem to be separated from neighboring ones by the same distance, or substantially 90 degree in FIG. 1. Thus, each of heads RPa, RPb, Pa, and Pb can be located with a respectively predetermined interval (angle with respect to the axis Ax). The azimuth angles of first R/W head RPa and first SR head Pa are preferably the same, and is a first predetermined angle. Similarly, the azimuth angles of second R/W head RPb and second SR head Pb are the same, and is a second predetermined angle different from the first predetermined angle for the sake of better tracking control. However, all heads can be made to have the same azimuth angle.

Figure 2:
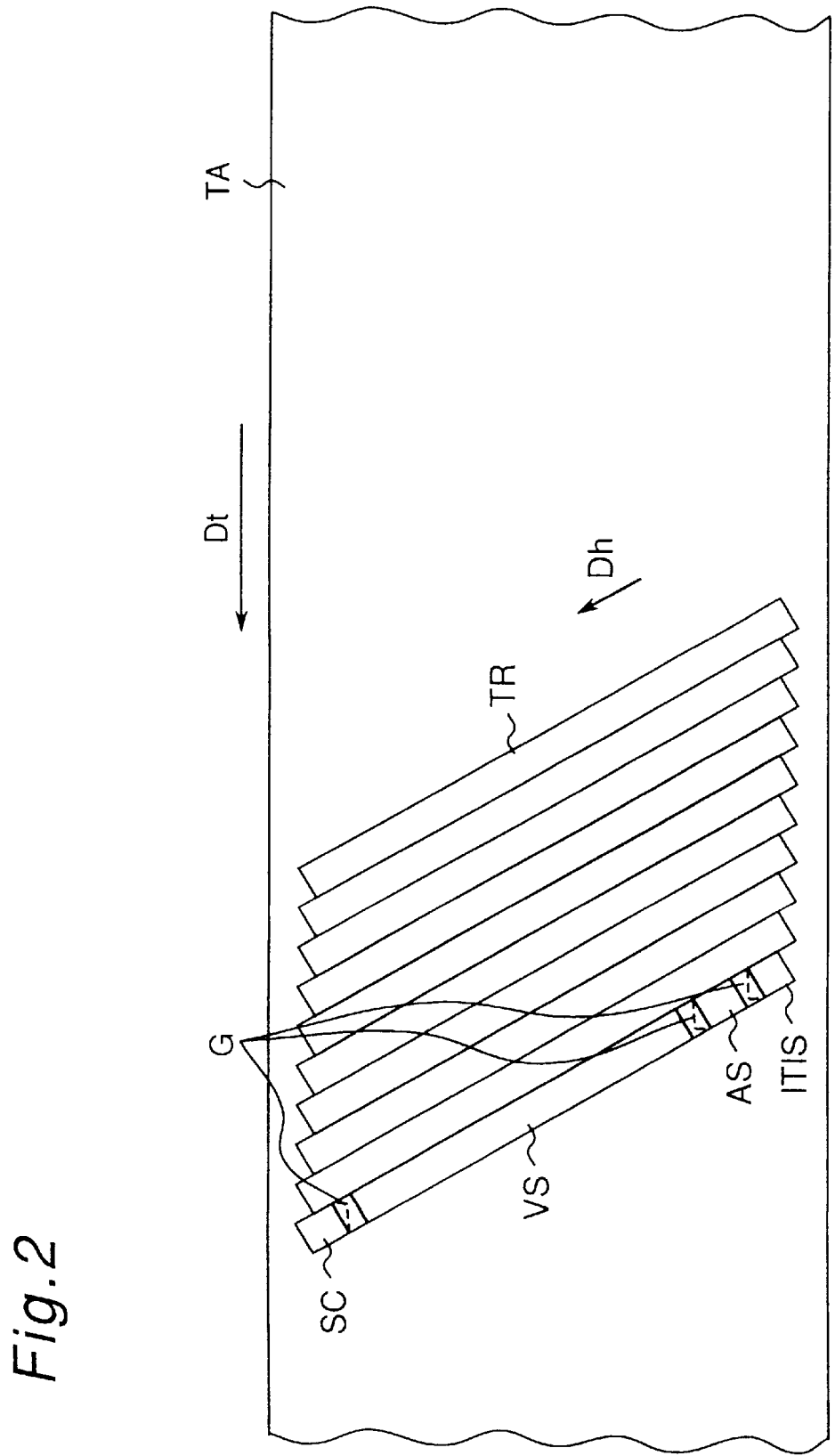
FIG. 2 is a graph schematically showing an example of tracks formed on a recording tape by the magnetic recording and reproducing apparatus of FIG. 1.

Referring to FIG. 2, an example of tracks formed by the head unit HU on the recording tape Ta under a digital video system is shown. Each of tracks TR comprises mainly four portions that are an ITI sector ITS, an audio sector AS, a video sector VS, and subcode sector SC separated by gaps G to each other.

Figure 3:
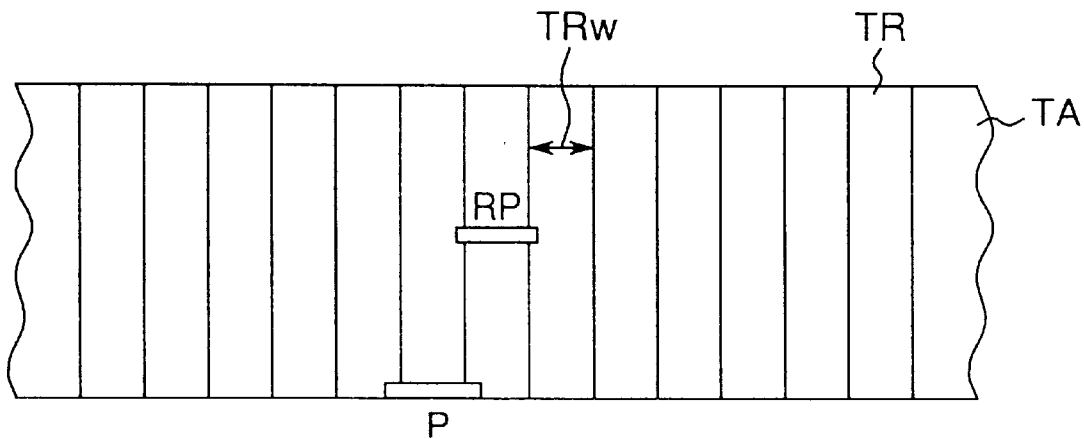
FIG. 3 is a graph in assistance of explaining a positional relationship among recording tracks formed on a tape, a reading/writing head, and a simultaneous reproducing head not in operation.

Referring to FIG. 3, a positional relationship among recording tracks formed on a tape, the R/W head RP and the SR head P not in operation is shown. As apparently shown in FIG. 3, the SR head P is constructed to have a recording width greater than that of the R/W head RP, and is further located to extrude from the both sides of track TR so as to scan the target track TR effectively even if the tracking control fails a little bit to guide the head unit HU. Preferably, the SR head P is 1.28 times wide as the R/W head RP. Both the heads RP and P are made to have the reproduction performance such the they can reproduce the data from the target track on which they scan at least two thirds area in the width of track.

In the playback mode, the two heads RPa and Pa of the first simultaneous scanning head pair SHa reproduce the recorded data Sva from the same track of recording tape TA to produce a first reproduction data SvR and a second reproduction data SvP, respectively. Similarly, the heads RPb and Pb of the second simultaneous scanning head pair SHb reproduce the recorded data Sva form other track next to that the first simultaneous scanning head pairs SHa scanned just before, and produces the first and second reproduction data SvR and SvP, respectively. Since the reproduction data SvR and SvP both reproduced by the head pairs SHa and SHb are substantially the same with respect to the operation according to the present invention, prefix "a" or "b" respectively indicating the first head pair SHa or SHb is attached to each of signal or data symbols as the need for identifying the head pair (head) concerned arises in this specification. Thus, the recorded data Sva is sequentially reproduced from the tracks on the recording tape TA by the first and second simultaneous scanning head pairs SHa and SHb.

The reproducing system RS includes a first reproduction unit RR connected to each of R/W heads RPa and RPb of simultaneous head pairs SHa and SHb for receiving the first reproduction data SvR (SvRa and SvRb)and SvP therefrom. In FIG. 1, a line connecting the first R/W head RPa and the unit RR is omitted for the sake of brevity. The first reproduction unit RR has a first reproducing amplifier 111, a first reproduction equalizer 113, and a first demodulator 116. The first amplifier 111 is connected to both the R/W heads RPa and RPb for increasing the magnitudes of the first reproduction data SvR and SvP received therefrom.

The first reproducing amplifier 111 is connected to both the R/W heads RPa and RPb to increase the magnitudes of the first reproduction data SvR and SvP received therefrom. Note that a line connecting the first R/W head RPa and the unit RR is omitted for the sake of brevity in FIG. 1.

The first equalizer 113 is connected to the amplifier 112 for receiving the amplified first reproduction data SvR and SvP therefrom to detects an envelope level thereof and adjusts the system clock to prevent a PLL (not shown) incorporated in the apparatus PMA from being unlocked. Then, the first equalizer 113 produces a first equalized reproduction data EvR (EvRa and EvRb) and a first envelope signal ER (ERa and ERb) thereof based on the reproduction data SvR (SvRa and SvRb). Similarly, a second equalized reproduction data EvP (EvPa and EvPb) and a second envelope signal EP (EPa and EPb) thereof are produced based on the reproduction data SvP.

The first demodulator 116 is connected to the first equalizer 113 for receiving the first equalized reproduction data EvR for demodulating thereof to produce a first demodulated reproduction data SmR (SmRa and SmRb). The demodulator 116 further produces a first synchronization start signal SsR indicative of a starting point of the synchronization blocks in the demodulated reproduction signal SmR.

The reproducing system RS further includes a second reproduction unit RP, similar to the first reproduction unit RR, connected to each of SR heads Pa and Pb of simultaneous head pairs SHa and SHb for receiving the second reproduction data SvP (SvPa and SvPb) therefrom. Also, a line connecting the first SR head Pa and the unit RP is omitted for the sake of brevity in FIG. 1. The second reproduction unit RP has a second reproducing amplifier 112, a second reproduction equalizer 114, and a second demodulator 117 that are connected to each other, as shown in FIG. 1. In substantially the same manner as those performed by the first reproducing unit RR, second amplified reproduction data SvP (SvPa and SvPb) corresponding to the data SvR (SvRa and SvRa), a second equalized reproduction data EvP (EvPa and EvPb) corresponding to data EvR (EvRa and EvRb), a second envelope signal EP (EPa and EPb) corresponding to signal ER (ERa and ERa), a second demodulated reproduction data SmP (SmPa and SmPb) corresponding to data SmR (SmRa and SmRb), and a second synchronization start signal SsP (SsPa and SsPb) corresponding to the signal SsR (SsRa and SsRb), respectively, based on the second reproduced data SvR (SvRa and SvRb).

The reproducing system RS further includes a data controller 130 connected to the first and second reproduction units RR and RP for receiving the first signals (data) ER, SmR, and SsR and the second signals (data) EP, SmP, and SsP, respectively, therefrom. Based on these signals, the data controller 130 detects the acquisition state of both demodulated reproduction data SmR and SmP to determine which one of heads RPa (RPb) and Pa (Pb) can read the data from the tape well, and further pass the data Sm read out by the determined head RPa (RPb) or Pa (Pb) to the next stage.

Figure 4:
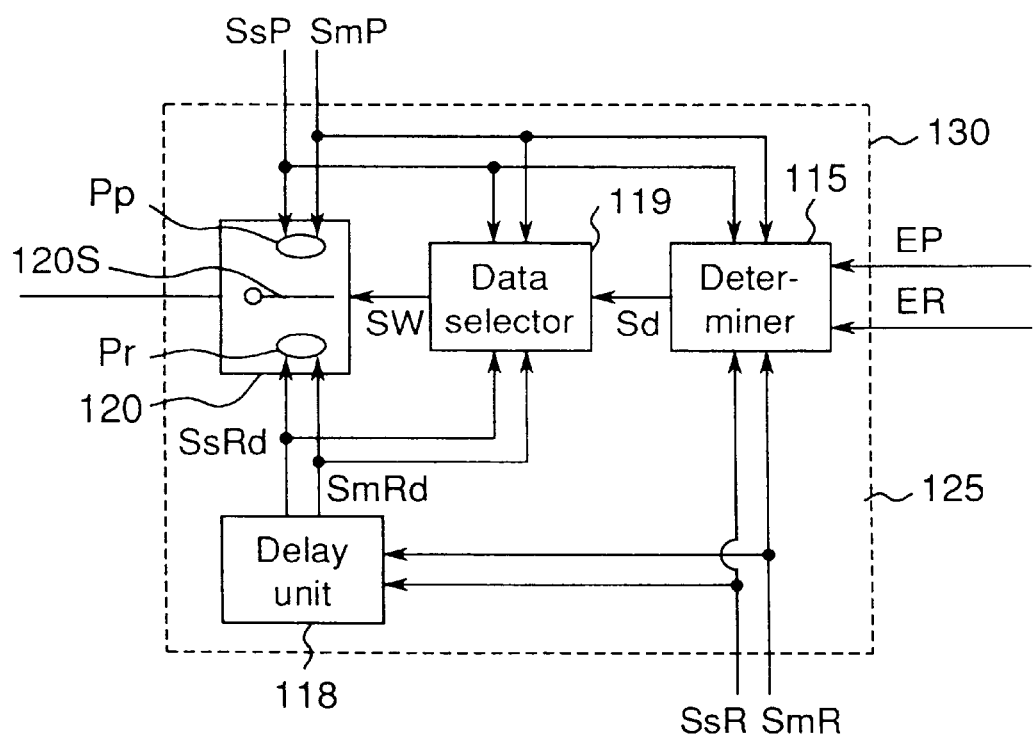
FIG. 4 is a block diagram showing details of the data controller of FIG. 1.

Referring to FIG. 4, detailed construction of the data controller 130 is shown. The data controller 130 has a determiner 115, a delay circuit 118, a data selector 119, and a select switch 120. The determiner 115 is connected to the first equalizer 113 and the first demodulator 116 of the first reproducing unit RR (FIG. 1) for receiving the first envelope signal ER from the equalizer 113 and the first synchronization start signal SsR and the first demodulated reproduction data SmR from the processor 116. The determiner 115 is further connected to the second equalizer 114 and the second demodulator 117 of the second reproducing unit RP (FIG. 1) for receiving the second envelope signal EP, the second demodulated reproduction data SmR, and the second synchronization start signal SsP therefrom.

Based on these signals (data) ER, SmR, and SsP from the first reproducing unit RR and signals (data) EP, SmP, and SsR from the second reproducing unit RP, the determiner 115 detects the acquisition state of both demodulated reproduction data SmR and SmP. For example, when both the synchronization start signals SsR and SsP are detected or not, it is determined that the data whose envelope signal has a greater amplitude than the other is well acquired. When only one of the synchronization start signals SsR and SsP is detected, it is determined that the data with the detected synchronization start signal is well acquired.

The determiner 115 determines which data SmR or SmP is better reproduced from the recording tape TA, and produces a determination signal Sd indicative of determination result. Specifically, the determiner 115 selects one of two demodulated data SmR and SmP that are simultaneously reproduced from the same track by the simultaneous scanning head pair based on the data acquisition level. In other words, the determiner 115 determines which one of two heads RPa (RPb) and Pa (Pb) of the simultaneous scanning head pair SHa (SHb) currently reproduce the data from the target track better than the other. The determination signal Sd is preferably updated every several frames (not in real time) during the normal playback mode, and is not updated during a special playback mode such as slow or rapid reproduction.

It is also effective to utilize an error rate that can be obtained by applying an inner error correction to the demodulated data Sm with respect to the synchronization start signal Ss for improving the operation precision of the apparatus PMA. As a result of the inner correction, an error correction rate with respect to each of reproduced data SmR and SmP. Specifically, one of the reproduced data SmR ad SmP having a smaller error rate is determined as being better acquired. These methods can be adapted in a single form as well as combined form.

For example, a method of combining the inner error rate and the amplitude of envelope signal is described. When the error rates of the both reproduced data SmR and SmP are good enough for completely correcting errors, the one of reproduced data SmR or SmP whose envelope signal has a greater amplitude is selected. When the error rate of one of the reproduced data (RmR for example) is too poor to correct errors, the other data (RmP for example) is selected. However, when the both error rate are too poor to correct errors, the data SmR reproduced by the R/W head RPa (RPb) is selected. Note that the determiner 115 can be easily designed by one skilled in the art from the descriptions in the above.

The delay unit 118 is connected to the first demodulator 116 for receiving the first demodulated reproduction data SmR and the first synchronization start signal SsR. The delay circuit 118 delays the first demodulated reproduction data SmR and the first synchronization start signal SsR by a predetermined time Td (t2) to produce a delayed first modulated reproduction data SmRd (SmRda and SmRdb) and a delayed first synchronization start signal SsRd for compensating the phase difference "y" between the R/W head RPa (RPb) and SR head Pa (Pb).

The data selector 119 is connected to the delay circuit 118 for receiving the delayed data SmRd and the delayed signal SsRd therefrom, and to the second demodulator 116 and 117 and the determiner 115 for receiving the demodulated data SmP FM and the synchronization start signals SsP. The data selector 119 is further connected to the determiner 115 for receiving determination signal Sd therefrom. Based on these signals, the data selector 119 selects either the first delayed demodulated reproduction signal SmRd and the second demodulated reproduction data and SmP, and produces a selection signal SW indicating the data SmR or SmP currently selected.

Specifically, the data selector 119 generally takes precedence the well acquired data Sm over the less acquired data Sm based on the determination signal Sd, meaning that the data which the head RP pr P scans the track to reproduce the date therefrom satisfactorily is selected. However, even thus selected head may fails to continue the data reproduction due to possible causes such as a head clogging. In this case, the data selector 119 selects the data reproduced by non-selected head instead of that reproduced by the selected head provided that the synchronization start signal Ss from the non-selected head is supplied to the data selector 119. This head selection by the data selector 119 is updated per synchronization block, because the determiner 115 does not update the determination signal Sd in real time. Note that the synchronization block is a basic unit for writing a data on a recording tape TA.

The selection switch 120 has a first input terminal Pr, a second input terminal Pp, and a selector 120 selectively connectable to either one of the input terminals Pr and PP. The first input terminal is connected to the delay circuit 118 for receiving the delayed first demodulated reproduction data SmRd and the delayed first synchronization start signal SsRd therefrom. The second input terminal Pp is connected to the second demodulator 117 for receiving the for receiving the second demodulated data SmP and the synchronization start signal SsP therefrom. The selector 120S is connected to the data selector 119 for receiving the selection signal Sw therefrom. The selector 120S selectively connects either one of two input terminals Pp and Pr to an output terminal of the selection switch 120 based on the selection signal Sw to pass the data and signal from either of the reproduction units RR and RP selected by the data selector 119.

Referring back to FIG. 1, the ECC corrector 121 is connected to the output terminal of the selection switch 120 (FIG. 4) of the data controller for receiving the selected modulated reproduction data Rm and synchronization start signal Ss therefrom. The ECC corrector 121 applies an error correction operation to the modulated reproduction data Rm to produce a reproduction data Rm free from error.

The digital decoder 122 is connected to the ECC corrector 121 for receiving the error corrected modulated reproduction data Rm and the synchronization start signal Ss, and decodes the data Rm to reproduce the original source data Sv. ECC error corrector 121 and the digital decoder 122 construct a reproducing decoder 123 for decoding the modulated data written from the recording media to reproduce the original source data Sv. Thus reproduced originals source data Sv is transmitted the outside of the apparatus through the output terminal 124.

Herebelow, operations of the magnetic recording and reproducing apparatus PMA according to the present invention under special reproduction modes such as fast-forward play, fast-reverse play and slow-forward, and slow-reverse play with reference to FIGS. 5, 6, 7, 8, and 9.

Also under the special reproduction mode wherein the head unit HU scans the tape TA with a different relative speed from the standard playback speed, the data reproduced by the head which the determination signal Sd indicates is taken precedence over the other head. However, since the tracing patterns of the head scanning the tape TA is subject to the relative moving speed of the tape and the head, the track tracing patterns of the R/W head RP and SR head P are not identical under a special playback mode.

Figure 5:
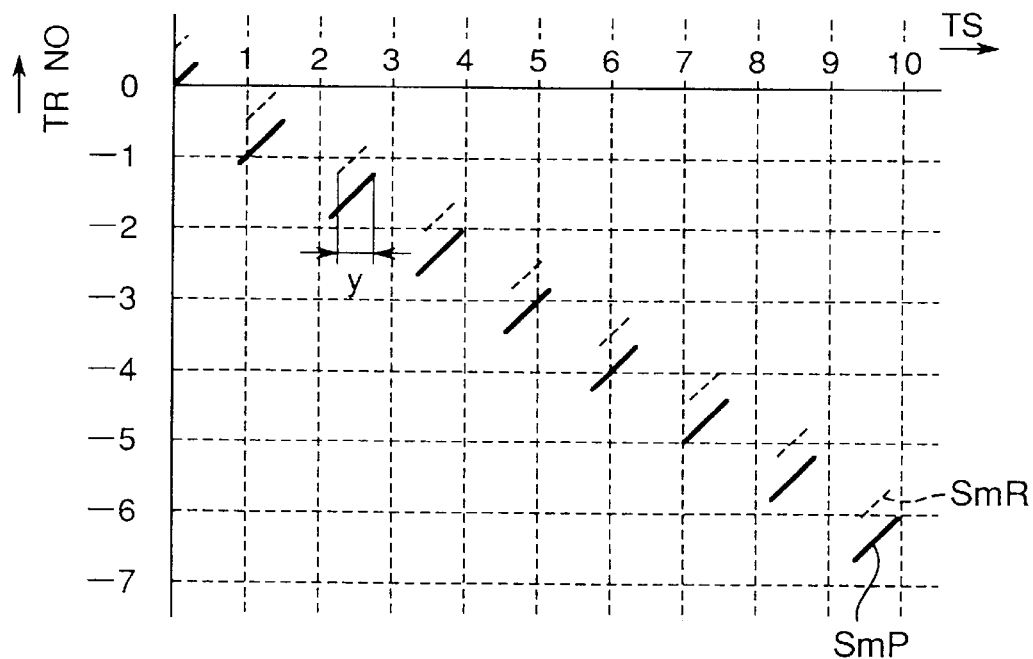
FIG. 5 is a graph showing track tracing patterns of R/W heads RP and SR head P of the magnetic recording and reproducing apparatus of FIG. 1 under a slow-reverse playback mode at a reduced speed two threes times of the normal playback speed in the reversed direction.

Referring to FIG. 5, an example of track tracing patterns of R/W heads RP and SR head P of simultaneous scanning head pairs SH under a slow-reverse playback mode wherein the data are reproduced at a reduced speed, or two thirds of the standard playback speed in the reversed direction, is shown. Numbers, 0 to 10, shown in the horizontal axis TS each indicates a track scanning period SST required for a single head to scan one track on the tape TA under the normal playback mode at the scanning speed same as the data writing. Numbers, −1 to −7, shown in the vertical axis each indicates track number of corresponding tracks, and is located on a boundary distinguishing the corresponding track from the next track. For example, the track TR-1 is described between the horizontal axes with 0 and −1.

Each of slant solid lines, rising up diagonally to the right side, represents a trace of the SR head scanning the data tracks, and corresponds to the data SmP reproduced from the scanned track. Each of slant dotted lines, rising up substantially parallel to the slant solid lines SmR, represents a trace of the R/W head RP scanning the data track. Note that the slant solid line SmP and the slant dotted lines SmR right above corresponds the track scanning by one simultaneous scanning head pair SH.

Figure 6:
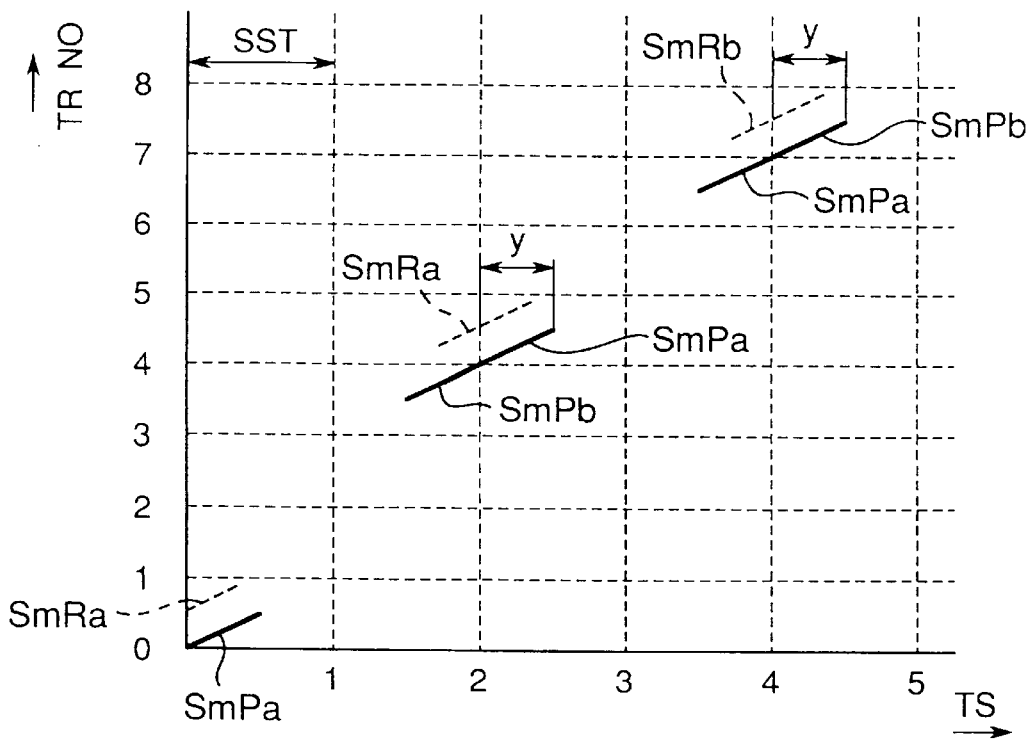
FIG. 6 is a graph showing track tracing patterns of R/W heads RP and SR head P of the magnetic recording and reproducing apparatus of FIG. 1 under a first-forward playback mode at an increased speed twice the normal playback speed.

Referring to FIG. 6, an example of track tracing patterns of R/W heads RP and SR head P of simultaneous scanning head pairs SH under a fast-forward playback mode wherein the data are reproduced at an increased speed twice as the standard playback speed, is shown. Numbers in the horizontal axis TS and in the vertical axis TR No. respectively indicate track scanning period SST and the track number in a manner similar to that in FIG. 5. Similarly, slant solid and dotted lines represent traces of the SR head P (Pa and Pb) and the R/W head RP (RPa and RPb), respectively.

As a result of special playback mode, the date reproduction at a speed different from the recording speed, the R/W head RP and the SR head P of the same simultaneous scanning head pair essentially scan different portions of the same target track. This principle is typically readable from FIG. 6, as follows.

During the first track scanning period, the first R/W head Ra scans the top half portion of the track TR0; and the first SR head Pa scans the bottom half of track TR0.

During the second track scanning period, the second SR head Pb scans the top half of the track TR3; and the first R/W head Ra scans the bottom half of the track TR4.

During the third track scanning period, the first SR head Ra scans the top half of the track TR4; and the first SR head Pa scans the bottom half of the track TR4.

During the fourth track scanning period, the second R/W head RPb scans the bottom half of the track TR7; and the first SR head Pa scans the top half of the track TR6.

During the fifth track scanning period, the second R/W head RPb scans the top half of the track TR7; and the second SR head Pb scans the bottom half of the track TR7.

As apparent from the above, the R/W head RP can scan a portion of track where the pairing SR head P fails to scan continually, so that the data SmR includes a data that can compensate the data SmP for the non-reproduced data in track area that the SR head P could not scan by attaching thereof to the end of the SmP. As a result, the data SmR includes the compensatory information for the data SmP, and should follow after the data SmP in time. It seems that the data SmP can be compensated by the compensatory data SmR by changing the head selection from the SR head P to R/W RP based on the determination signal Sd from the determiner 115, resulting in the increased acquisition of the data reproduction. Such head selection change may be executed at a unit of synchronization block.

However, since the R/W head Rp and SR head P are located with the predetermined interval Y for enabling the simultaneous scanning of the same target, there is a phase difference "y" available between the data SmR and SmP reproduced thereby. In other words, the data SmR is preceding to the data SmP by the phase difference "y". Therefore, both the data SmP and SmR will be read out from the track at the same period, disabling the compensatory portion of data SmR from being reproduced after the SmP.

The phase difference "y" is generally defined by the following equation of $$y = x/180 \times ST, \quad (0 < (x/180) < 2/n) \qquad (1),$$

wherein "x" is an angle (degree) between R/W head and S/R head of the same simultaneous head pair, "n" is number of R/W head on the cylinder.

To solve this problem, according to the magnetic recording and reproducing apparatus PMA, the data SmR is shifted toward the data SmP to be compensated by a period corresponding to the phase difference "y". This operation to compensate the data reproduced by the simultaneous scanning head pair according to the present invention will be described with reference to FIGS. 7, 8, and 9.

Figure 7:
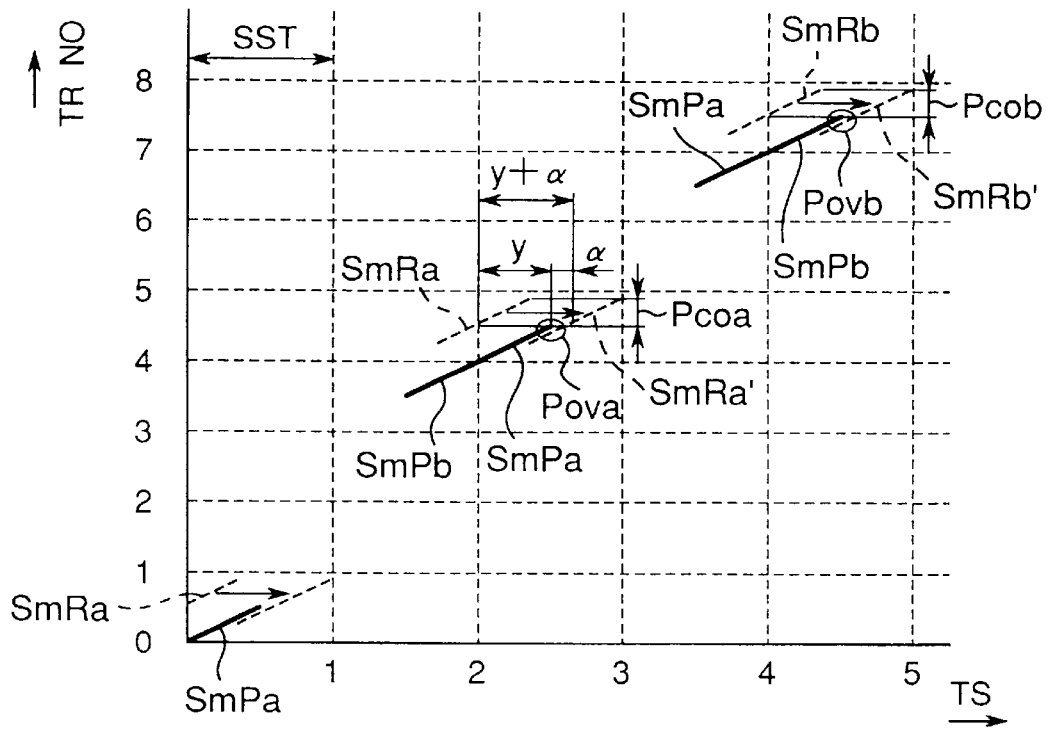
FIG. 7 is a graph, similar to FIG. 6, but in assistance of explaining the data compensation operation according to the present invention.

Referring to FIG. 7, the concept of data compensation according to the present invention is shown. FIG. 7 is substantially identical to FIG. 6, but several additional lines are illustrated therein for the convenience of explanation. The data SmRa read out from the track TR4 during the second scanning period is shifted, or delayed, toward the data SmPa by a period corresponding to the phase difference "y" and an supplementary delay factor α. As a result, a shifted data SmRa' that is deferred later than the data SmPa by the supplemental delay factor α. This supplement delayed period a makes it possible to overwrite the top end portion Pova of the data SmPa with the deferred data SmRa'.

Thus deferred data SmRa' can be separated in two parts, a compensatory data Pcoa and an overwriting data Pova. The compensatory data Pcoa has no data common with the data SmPa, and the overwriting data Pova has data common with the data SmPa. Similarly, a data SmRb' produced by delaying the SmPa can be separated in a compensatory data Pcob and an overwriting data Povb.

Specifically describing with the reproduction data SmPb and SmRb read from the track TR7 during the fourth scanning period, when the data SmRb is delayed only by the phase difference "y", both data SmPb and SmRb' are arranged on the same presentation time axis as being seamless merged each other, except the portion of the overwriting data Povb. In this case, the overwriting data Povb is preferably discarded such that the determiner 115 of data controller 130 changes the SR head RP to the R/W head P to connect the compensatory data Pcob to the data SmPb.

When the data SmRb is further delayed by the supplemental delay factor α, as being placed after the data SmRb by α. In this case, the supplemental delay time α can give a margin time for more exquisite data compensation according to the present invention. The both data SmRb' and SmPb can be supplied to the reproducing decoder 123 (FIG. 1), since they are not on the same presentation time base as described in the above. As a result, the ECC corrector 121 can examine the compensatory data Povb and the top end portion of the data SmPb corresponding to the compensatory data Povb based on an error rate obtained by the inner error correction (but not limited to). Then, the ECC corrector 121 selects the compensatory data Povb or the corresponding part of SmPb which ever the acquisition level is good, and outputs together with the compensatory data Pcob and the body of the compensated data SmPb. Needless to say, the operation described here is also effective the reproduction data SmPa, SmRa, Pcoa, and Pova obtained with respect to track TR4 during the third scanning period.

This portion Pova is before the specific part of the data SmP where the data reproduction is hard due to the time difference between the data and the data error, and is overwritten by the data SmRa' from the other head of the same head pair. Note that the data portion Pova is not always overwritten. For example, when the error rate of overwriting data SmRa' is greater than that of to be overwritten data Pova (SmPa), data overwriting is suppressed. Thus, the overwritten portion Pova can use the data having less error rate.

Furthermore, since the head is changed to the other based on the unit of synchronization block, the data can be reproduced securely according to every synchronization block. More specifically, the data on the portion of track that the SR head P can scan to reproduce the data therefrom can be compensated with the data reproduced by the R/W head RP. In this case, a phase difference between the two data that are compensating data and to be compensated data is adjusted by the delay unit 118 of the data controller 130 (FIG. 4) to bestow the time difference α for the system. As a result, the data acquisition rate is improved; the update rate of image per frame is increased; and then the improved image quality can be obtained.

The supplemental delay factor α can be generally defined by the following equation of $$\alpha > t1 \text{ or } t2 \text{ (whichever greater than the other)} \qquad (2),$$

wherein "t1" is a time required for the electric circuit for switching the data, and "t2" is the temporal intermittent time caused by pattern gaps with respect to the data track. The delay unit 118, in combination with the y+α delay, acts as a second delay means for delaying the first delayed signal by a second delay time.

Figure 8:
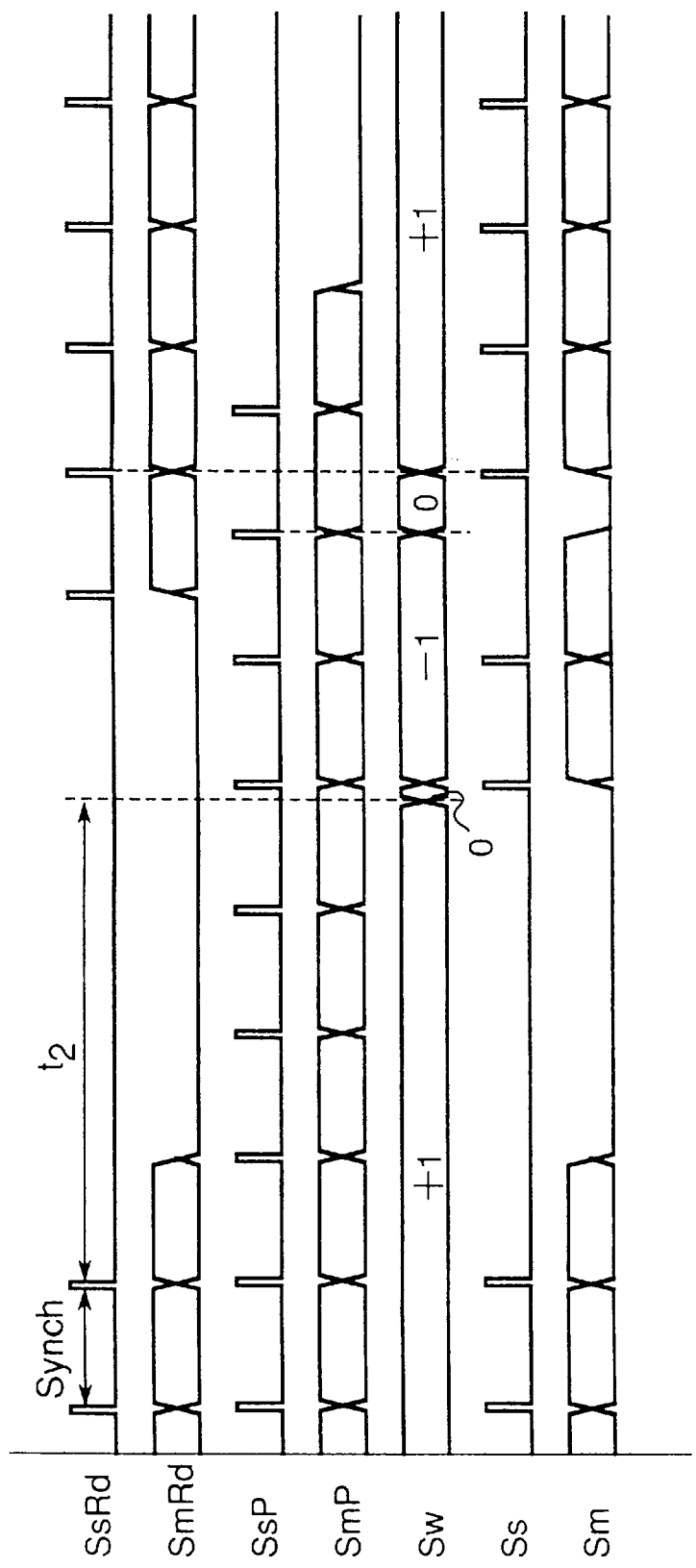
FIG. 8 is a graph showing various signals (data) observed in the magnetic recording and reproducing apparatus of FIG. 1 during the data compensating operation.

Referring to FIG. 8, a time chart of the magnetic recording and reproducing apparatus PMA is shown. In this example, a priority is given to the data SmR reproduced by the R/W head for the selection by the data controller 130. As shown in FIG. 8, the signal Sw has three values, "+1" indicating the R/W head RP (SmRd), "−1" indicating the SR head P (SmP), and "0" indicating none. In this example, the head selection priority is given to the R/W head.

Though the data SmRd from the R/W head RA is not supplied after the first three synchronization blocks, the data selector 119 will not update the selection signal Sw (continuously indicating the priority of the R/W head) for a predetermined period t2 (Td) counted after the second synchronization block of data SmRd. This delay time t2 is prepared for preventing the data controller 130 from misselecting the data SmR or SmP. Because various pattern gaps are available in the data recorded on the data tracks, and such gaps easily causes the intermittence of data reproduction temporarily even from the fully recorded tracks. To avoid mis-selection of the head caused by such temporal intermittence, the waiting time t2 that is a margin for switching of heads is prepared. Therefore, the data selector 119 updates the selection signal Sw from "+1" to "−1" via "0" to indicate the SR head P in the case that no synchronization block of the data SmRd is supplied from the priority head RP for at least three synchronization block period in this example.

However, the data SmRd from the R/W head RP which is the priority head resumes, the data selector 119 updates the selection signal Sw from "−1" to "+1" via "0" at the next synchronization block time. The switch from the priority head to the non-priority head is performed carefully, but the reverse direction switching is performed rapidly. Thus, the data from the priority head are mainly used in the magnetic recording and reproducing apparatus PMA of the present invention. This waiting time t2 and the margin time of three synchronization blocks can be suitably determined in consideration of various operation factors such as a recording format and head arranging pattern.

Furthermore, also under a slow-forward playback or slow-reverse playback mode, the data which the priority head can not reproduce can be the compensatory data reproduced by the non-priority head in a manner similar to that with the fast-forward playback or fast-reverse playback mode as described in the above. Specifically, the delay unit 118 adjusts the phase difference between the two heads of simultaneous scanning head pair, so that the data from the priority head can be compensates by the data from non-priority head. Thus, the reproduction speed range enabling noiseless playback can be expanded.

Figure 9:
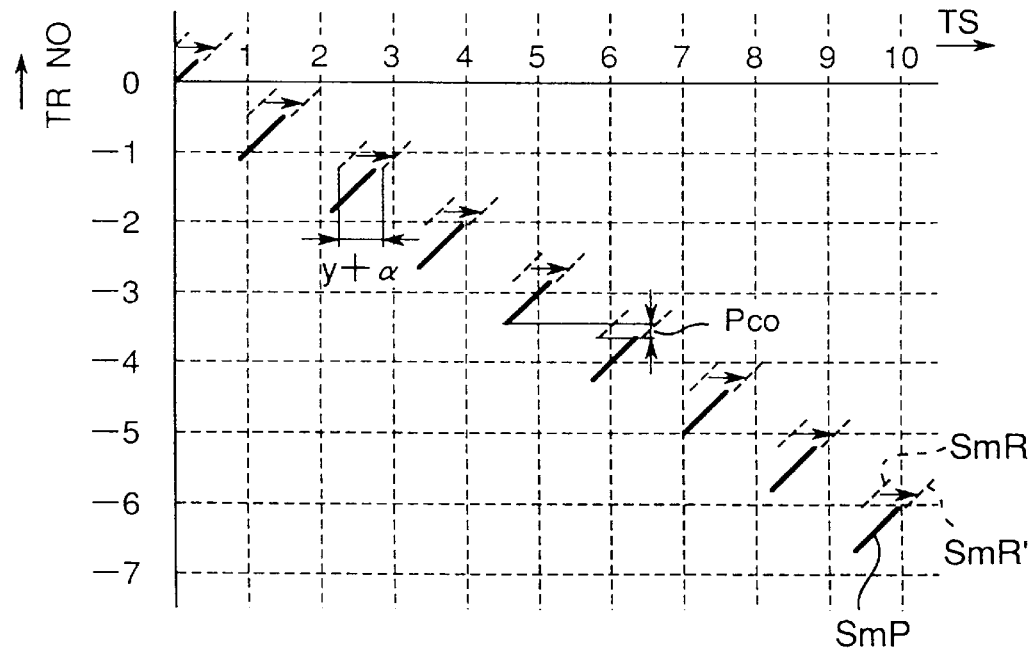
FIG. 9 is a graph sowing track tracing patterns of R/W heads RP and SR head P of the magnetic recording and reproducing apparatus of FIG. 5 after data compensating operation.

Referring to FIG. 9, track tracing patterns of R/W heads RP and SR head P of the magnetic recording and reproducing apparatus of FIG. 5 after data compensating operation are shown. The trace patterns under the slow-reverse playback at the reduced speed two-three times of the normal playback shown in FIG. 5 can be improved as shown in FIG. 9. Thus, the data cain be reproduced with keeping the continuity of track number.

Figure 10:
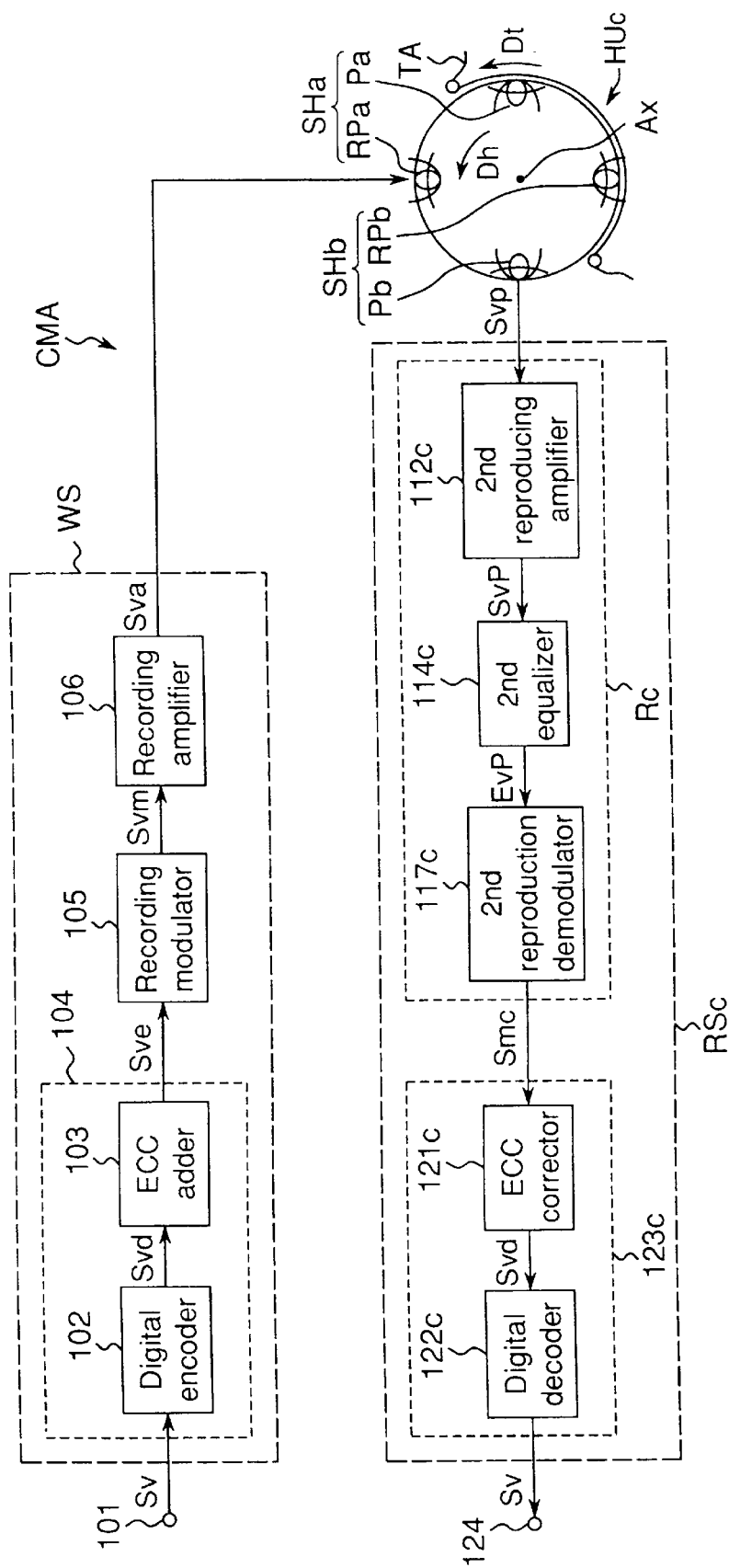
FIG. 10 is a block diagram schematically showing a conventional magnetic recording and reproducing apparatus.
Figure 11:
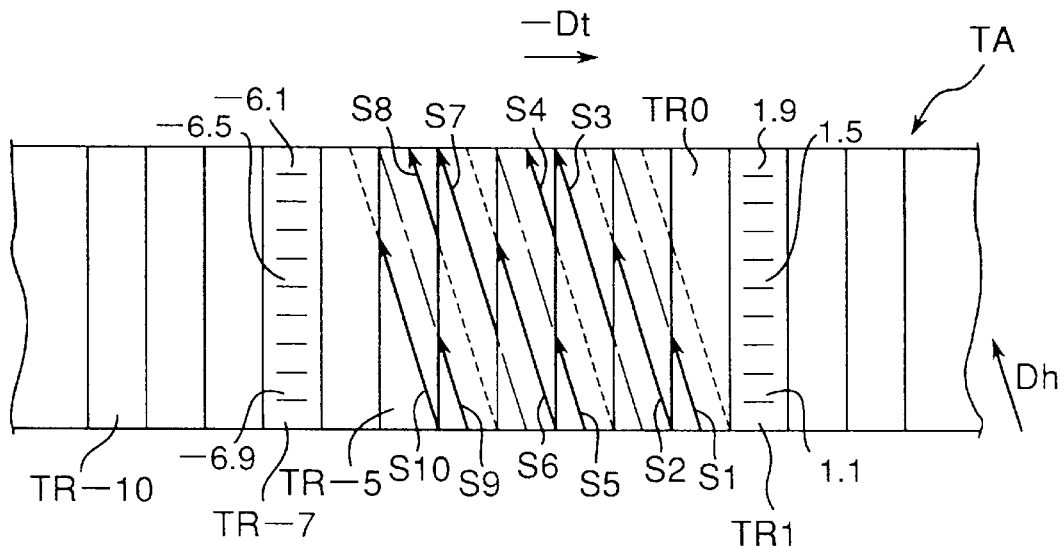
FIG. 11 is a graph schematically showing a trace of a simultaneous reproducing head formed on a recording tape during a slow reproduction mode wherein the reproduction speed is half times of a normal reproduction speed in the magnetic recording and reproducing apparatus of FIG. 10.
Figure 12:
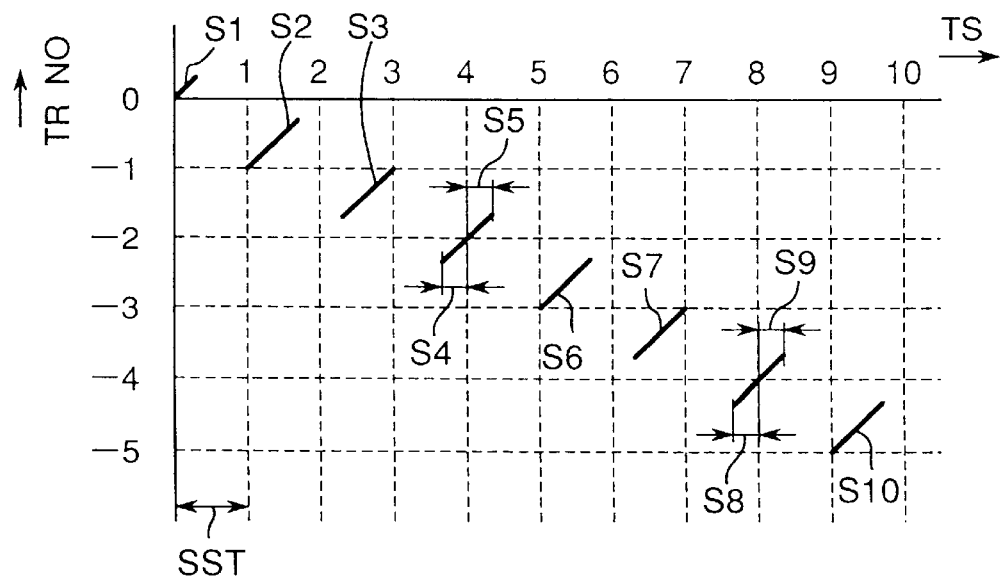
FIG. 12 is a graph in assistance of explaining a relationship between a track scan period by the simultaneous reproducing head and corresponding reproducible track number.

As apparent from FIGS. 11 and 12, even in the. conventional magnetic recording and reproducing apparatus CMA shown in FIG. 10 can reproduce the data from the tape keeping the continuity of track numbers in the range of slow-reverse playback speed from 0 to −½ of normal playback speed. Even though the head sometimes fails to read the data from the tracks scanned by themselves In other words, the data can be reproduced from every track, enabling a noiseless slow playback mode. Specifically, the data on the track TR-5 can be reproduced fully by head tracings S8 and S10, as shown in FIG. 11. Under the noiseless slow playback mode means, full frame images can be reproduced at a reduced speed.

Figure 13:
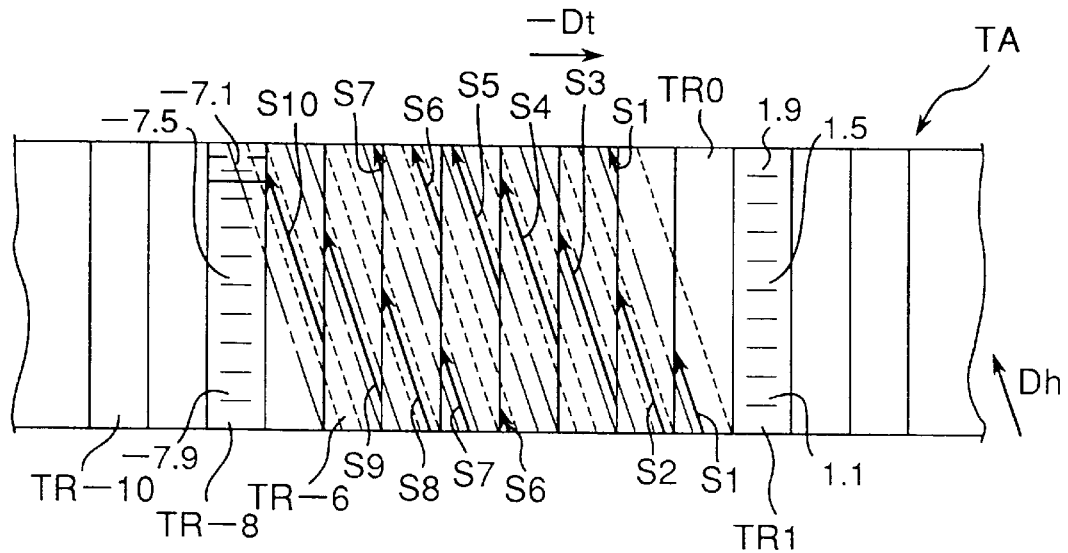
FIG. 13 is a graph similar to FIG. 10, but the reproduction speed is a two thirds of normal reproducing speed.
Figure 14:
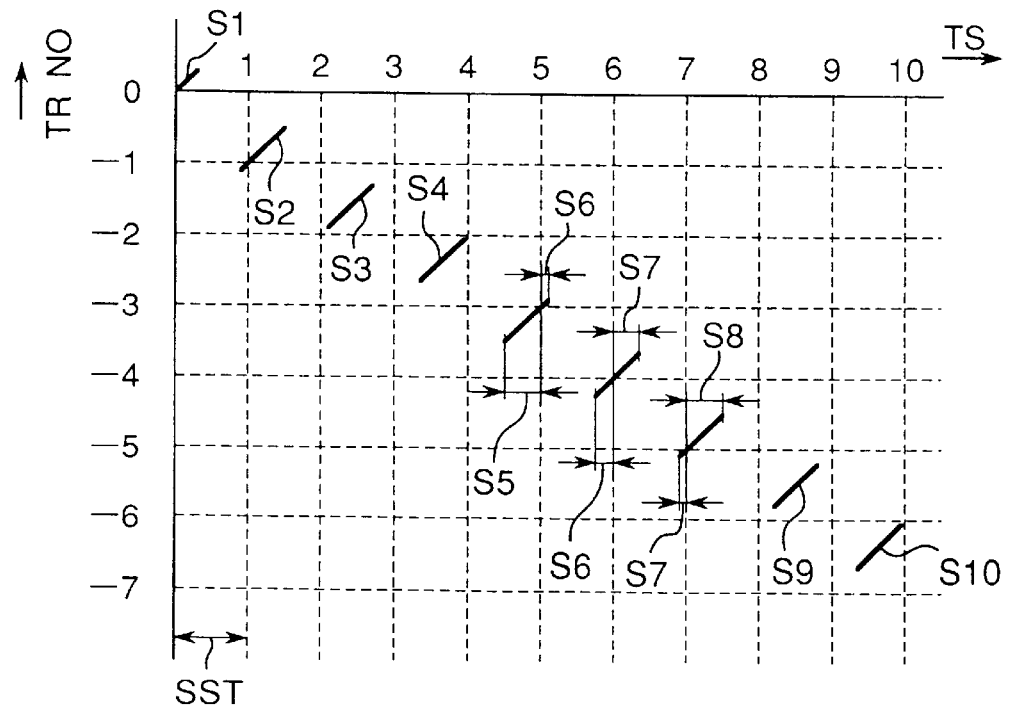
FIG. 14 is a graph similar to FIG. 11, but the reproduction speed is a two thirds of normal reproducing speed.

In FIG. 13, traces of head on the recording tape by the conventional magnetic recording and reproducing apparatus CMA under a slow-reverse playback mode, similar to those shown in FIG. 11 but the data reproduction is two thirds of the normal playback speed, is shown. In FIG. 14, a relationship between track scanning periods and the tracks from which the data can be reproduced under the half-speed slow-reverse playback mode of FIG. 13 are shown. As is apparent from FIGS. 13 and 14, the data on the track TR-5 can be intermittently reproduced by head tracings S6 and S8, enabling the noiseless slow playback. Thus, the reproducing speed enabling the noiseless slow playback is limited in the conventional magnetic recording and reproducing apparatus having simultaneous scanning head pairs.

In this specification, the present invention is described with respect to the embodiment having two simultaneous; scanning heads SHa and SHb. However, as apparent from the above description, the present invention can be effectively performed as being aimed with only one simultaneous scanning head pair SHE: constructed by a single of R/W head RP and a single of SR head P.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magnetic recording and reproducing apparatus that records information on a recording medium having a plurality of data tracks for storing said information, said apparatus comprising:

a read/write head that writes said information to said data tracks and reads said information from said data tracks to produce a first reproduction signal, a reading head, provided at a predetermined interval from said read/write head, that reads the same data tracks read by said read/write head to produce a second reproduction signal, said second reproduction signal being delayed from said first signal by a first delay time corresponding to said interval, a delay device that delays said first signal by said predetermined interval to produce a first delayed signal, said first delayed signal being on a same time base of said second reproduction signal;

a signal selector that discards a portion of one of said first delayed signal and said second reproduction signal that overlap a remaining one of said first delayed signal and said second reproduction signal; and a compensating device that forms a combined reproduction signal from said first delayed signal and said second reproduction signal.

2. The magnetic recording and reproducing apparatus as claimed in claim 1, wherein said signal selector always discards a portion of said first delayed signal that overlaps the said second reproduction signal.

3. The magnetic recording and reproducing apparatus as claimed in claim 1, said delay device further comprising a supplementary deferring device for deferring said first delayed signal by a supplementary interval to produce a deferred signal.

4. The magnetic recording and reproducing apparatus as claimed in claim 3, further comprising a determining device for determining a better signal of said deferred signal and said second reproduction signals based on at least signal error rate, wherein said signal selector discards a portion of one of said first delayed signal and said second reproduction signal that overlaps the better signal of said first delayed signal and said second reproduction signal.

5. The magnetic recording and reproducing apparatus as claimed in claim 4, wherein said determining device uses said supplementary interval for determining a better signal.

6. The magnetic recording and reproducing apparatus as claimed in claim 4, wherein said supplementary interval is the longer one of a time required for an electrical circuit including said signal selector to switch data and a temporal intermittent time caused by pattern gaps with respect to said data tracks.

7. The magnetic recording and reproducing apparatus as claimed in claim 4, wherein said read/write head reads said information from said data tracks to produce a first reproduction signal, and said simultaneous reading head reads the same data tracks read by said read/write head to produce a second reproduction signal, in a special reproduction mode selected from fast-reverse, fast-forward, slow-reverse, and slow-forward playing modes having reproduction rates different from normal playback.

* * * * *